3,457,231
POLYMERS OF AT LEAST ONE AROMATIC DI-
ALDEHYDE AND DITHIOOXAMIDE AND A
METHOD FOR MAKING SAME
Richard J. Sonnenfeld, Bartlesville, Okla., assignor to
Phillips Petroleum Company, a corporation of Delaware
No Drawing. Filed Nov. 8, 1965, Ser. No. 506,833
Int. Cl. C08g 20/32, 9/20
U.S. Cl. 260—72                                    7 Claims

ABSTRACT OF THE DISCLOSURE

A polymer is formed by polymerizing at least one aromatic dialdehyde with dithiooxamide. The polymer has good heat stability and can be used in high temperature applications as paint, varnish, wire or other substrate coatings, electrical insulation, aerospace applications, and the like.

---

This invention relates to a new and improved method for making polymers and the product thereof.

Interest in high temperature resistant materials is increasing rapidly at present due to continous technological advances which call for stability under industrial applications at temperatures which heretofore were considered only in the laboratory.

It has now been found that a polymeric material having particularly good heat stability can be formed by polymerizing at least one aromatic dialdehyde with dithiooxamide.

Accordingly, the polymers of this invention are copolymers of at least one aromatic dialdehyde and dithiooxamide.

Accordingly, an object of this invention is to provide a new and improved method for making heat-stable polymers and the product thereof.

Other aspects, objects, and the several advantages of this invention will be apparent to those skilled in the art from the description and appended claims.

According to this invention, one or more aromatic dialdehydes containing from 8 to 20 carbon atoms per molecule, inclusive, are copolymerized with dithiooxamide. Aromatic dialdehydes that are applicable include phthalaldehydes; dialdehydes of condensed ring aromatic compounds such as naphthalene, anthracene, and phenanthrene, the dialdehyde compound containing from 12 to 16 carbon atoms per molecule, inclusive; and dialdehydes of polycyclic aromatic compounds such as biphenyl and terphenyl, the dialdehyde compound containing from 14 to 20 carbon atoms per molecule, inclusive.

Examples of suitable dialdehydes are:

phthalaldehyde;
isophthalaldehyde;
terephthalaldehyde;
1,2-naphthalenedicarboxaldehyde;
1,3-naphthalenedicarboxaldehyde;
1,4-naphthalenedicarboxaldehyde;
1,6-naphthalenedicarboxaldehyde;
1,8-naphthalenedicarboxaldehyde;
2,6-naphthalenedicarboxaldehyde;
1,7-naphthalenedicarboxaldehyde;
2,5-naphthalenedicarboxaldehyde;
1,4-anthracenedicarboxaldehyde;
1,6-anthracenedicarboxaldehyde;
1,10-anthracenedicarboxaldehyde;
2,3-anthracenedicarboxaldehyde;
2,7-anthracenedicarboxaldehyde;
1,2-anthracenedicarboxaldehyde;
1,9-anthracenedicarboxaldhyde;
9,10-anthracenedicarboxaldehyde;
1,2-phenanthrenedicarboxaldehyde;
1,4-phenanthrenedicarboxaldehyde;
1,9-phenanthrenedicarboxaldehyde;
2,3-phenanthrenedicarboxaldehyde;
3,5-phenanthrenedicarboxaldehyde;
9,10-phenanthrenedicarboxaldehyde;
4,4'-biphenyldicarboxaldehyde;
3,3'-biphenyldicarboxaldehyde;
2,3-biphenyldicarboxaldehyde;
2,4-biphenyldicarboxaldehyde;
2,6-biphenyldicarboxaldehyde;
2,2''-(p-terphenyl)dicarboxaldehyde;
2,3-(o-terphenyl)dicarboxaldehyde;
2,6'-(m-terphenyl)dicarboxaldehyde;
1,4'-(o-terphenyl)dicarboxaldehyde;
4,4''-(p-terphenyl)dicarboxaldehyde;
3,3'-(p-terphenyl)dicarboxaldehyde;
2,6-(o-terphenyl)dicarboxaldehyde; and the like.

Preferred dialdehydes are the phthalaldehydes be they of the ortho, meta, or para configuration.

Although not yet completely understood to a certainty and therefore not desiring to be bound thereby, it is presently believed that the reaction between the aromatic dialdehyde and the dithiooxamide can be represented by the following equation in which the aldehyde is terephthalaldehyde:

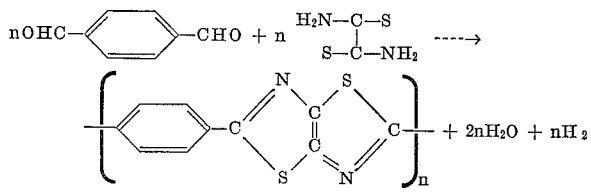

It is preferred that stoichiometric amounts of the dialdehyde and dithiooxamide are reacted together; however, an excess of one component over the other can be employed up to a maximum of about 10 mol percent excess.

The polymerization temperature can vary widely but generally will be in the range of from about 150 to about 350° C. The reaction time can also vary widely but will generally be from a few minutes, e.g. 3, to about 20 hours or longer. The reaction pressures can be atmospheric or superatmospheric (autogenous) and generally should be that which is sufficient to maintain the reactants, diluents, and the like substantially in the liquid phase. For example, if a diluent is employed and the reaction pressure is substantially atmospheric, then the boiling point of the diluent should be at least about 150° C.

Although the reaction can be carried out in the presence or absence of a diluent, a diluent is preferred. Generally, any diluent that is substantially inert to the reactants under the polymerization conditions can be employed. The diluent is preferably a hydrocarbon including one or more paraffins and/or aromatics each containing from about 7 to 20 carbon atoms per molecule, inclusive. Suitable paraffins include heptanes, octanes, decanes, dodecanes, tridecanes, pentadecanes, heptadecanes, octadecanes, eicosanes, and the like. Suitable aromatic hydrocarbons include toluene, ethylbenzene, xylene, 1-ethyl-2-methylbenzene, mesitylene, cumene, and the like. Besides mixtures of paraffins and aromatic compounds, other mixtures of hydrocarbons such as refined mineral oil can also be employed as a diluent. Either or both of the reactants can be dissolved in a suitable solvent such as acetone to facilitate contact of the reactants.

If desired, minor amounts of higher aldehydes such as tri- and tetraaldehydes can be added to the reaction mixture to provide some cross-linking within the polymer and therefore increase the thermal stability of that polymer. Examples of suitable higher aldehydes include 1,3,5-benzenetricarboxaldehyde; 1,2,4,5 - benzenetetracarboxaldehyde; 1,4,5-naphthalenetricarboxaldehyde; 2,3,6,7 - naphthalenetetracarboxaldehyde; 2,4,4'-biphenyltricarboxaldehyde; and the like. The amount of higher aldehyde employed will generally be in the range of from about 0.001 to about 10, preferably from about 0.5 to about 5, weight percent based on the total quantity of dialdehyde and dithiooxamide charged to the reactor.

The polymers of this invention are substantially insoluble in the hydrocarbon medium in which they are prepared and precipitate therefrom as formed. At the conclusion of the reaction the polymer can be separated from the reaction medium by conventional methods such as centrifugation, filtration, and the like. The polymer can then be washed and dried in a conventional manner and is thereafter suitable for use in high temperature applications as paint, varnishes, wire or other substrate coatings, electrical insulation, aerospace applications, and generally any other use requiring high temperature service.

Example

Twenty-five gram millimoles of dithiooxamide, 25 gram millimoles of terephthalaldehyde, and 60 milliliters of acetone were charged to a reactor. The mixture was heated to a maximum temperature of 220° C. over a 4-hour period during which time refined mineral oil was added drop-wise as the acetone distilled therefrom. A dark reddish-brown product was separated from the mineral oil reaction medium by washing the reaction mixture from the reactor with cyclohexane and collecting the polymer on a Buchner funnel. The collected polymer product was washed with acetone to remove any soluble material, dried, and subjected to elemental analysis which gave the following results:

| | Found, wt. percent | Theoretical,[1] wt. percent |
|---|---|---|
| Carbon | 56.7 | 55.3 |
| Hydrogen | 3.6 | 2.3 |
| Nitrogen | 12.0 | 12.9 |
| Sulfur | 23.6 | 29.5 |
| | 95.9 | 100.0 |

[1] Based on

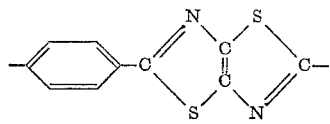

units in the polymer.

The polymer product of this invention was a substantially infusible solid that was self-extinguishing when subjected to conventional burning tests. The heat stability of the polymer was tested by heating a 10 milligram sample in a nitrogen atmosphere from about 100 to about 1000° C., at a rate of heating of 15° C. per minute. The weight loss of the sample was determined at intervals throughout the heating period and the results are as follows:

| Weight percent loss: | Deg. C. (up to) |
|---|---|
| 20 | 500 |
| 40 | 700 |
| 60 | 1000 |

These data show the good heat stability of the polymer of this invention.

Reasonable variations and modifications are possible within the scope of this disclosure without departing from the spirit and scope thereof.

I claim:

1. A method for making a polymer comprising reacting under polymerization conditions of elevated temperature of from about 150 to about 350° C. and pressure sufficient to maintain the reactants substantially in the liquid phase a mixture consisting essentially of at least one aromatic hydrocarbon dialdehyde containing from 8 to 20 carbon atoms per molecule, inclusive, and dithiooxamide, the amounts of reactants employed varying from substantially stoichiometric up to a 10 mol percent excess of the aldehyde over the oxamide or the oxamide over the aldehyde.

2. The method according to claim 1 wherein the aromatic dialdehyde is selected from the group consisting of phthalaldehydes of condensed ring aromatic compounds in which the dialdehyde compound contains from 12 to 16 carbon atoms per molecule, inclusive, and dialdehydes of polycyclic aromatic compounds in which the dialdehyde compound contains from 14 to 20 carbon atoms per molecule, inclusive.

3. The method according to claim 2 wherein the reaction is carried out in the presence of an inert diluent.

4. The method according to claim 2 wherein the aromatic dialdehyde is terephthaldehyde.

5. A copolymer formed according to claim 1.

6. A copolymer formed according to claim 2.

7. A copolymer formed according to claim 4.

References Cited

UNITED STATES PATENTS 2,574,114  11/1951  Lehmann _____ 260—72

OTHER REFERENCES

Ser. No. 382,947, Bergk (A.P.C.), published April 1943.

WILLIAM H. SHORT, Primary Examiner

E. M. WOODBERRY, Assistant Examiner

UNITED STATES PATENT OFFICE

CERTIFICATE OF CORRECTION

Patent No. 3,457,231                              Dated: July 22, 1969

Inventor            Richard J. Sonnenfeld

It is certified that error appears in the above-identified patent and that said Letters Patent are hereby corrected as shown below:

Column 4, line 27, after "phthalaldehydes" insert --- , dialdehydes ---.

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents